Dec. 27, 1955 A. J. HANNUM ET AL 2,728,856

BI-FREQUENCY ELECTRONIC OSCILLATOR NETWORKS

Filed May 22, 1952 2 Sheets-Sheet 1

INVENTORS.
ARTHUR J. HANNUM,
HAROLD A. NORBY,
BY Nicholas T. Volsen
ATTORNEY.

Dec. 27, 1955 A. J. HANNUM ET AL 2,728,856

BI-FREQUENCY ELECTRONIC OSCILLATOR NETWORKS

Filed May 22, 1952 2 Sheets-Sheet 2

INVENTORS.
ARTHUR J. HANNUM,
BY HAROLD A. NORBY,
Nicholas T Volsk
ATTORNEY.

United States Patent Office 2,728,856

Patented Dec. 27, 1955

2,728,856

BI-FREQUENCY ELECTRONIC OSCILLATOR NETWORKS

Arthur J. Hannum, Los Angeles, and Harold A. Norby, Culver City, Calif., assignors, by mesne assignments, to Hughes Aircraft Company, a corporation of Delaware Application May 22, 1952, Serial No. 289,412

7 Claims. (Cl. 250—36)

This invention relates to bi-frequency electronic oscillator networks and more particularly to bi-frequency electronic oscillator networks for selectively generating an electrical output signal of one or two frequencies in response to intelligence signals applied thereto.

In numerous applications of electronic systems and digital computers wherein a two-state or binary coding system is utilized for representing intelligence, it is desirable to represent the binary digits of the code as electrical signals suitable for transmission between two remote points. For example, the prior art has developed electronic systems for transmitting a carrier signal which is modulated by steady-state signals corresponding to the conventional voltage level representation of binary digits. When amplitude modulation is utilized, the envelope of the carrier signal corresponds to the binary number being transmitted. On the other hand, when frequency modulation is utilized, the binary digits being transmitted are represented by frequency shifts about the center frequency of the carrier signal.

One of the fundamental limitations of these prior art systems is that the binary digits corresponding to the coded information must be transmitted serially, that is, voltage levels corresponding to the binary digits to be transmitted must modulate the carrier signal in the sequential order of the binary digits. In addition, if the binary number to be transmitted by such systems comprises a plurality of binary digits coded in a conventional weighting system such as 8, 4, 2, 1, for example, means must be provided for synchronizing the transmitter and receiver in order to properly translate the weighting of each binary digit received as an electrical signal at the receiver. In practice, it has been found that, in many instances, it is difficult to achieve synchronization of the signals.

Another limitation of the prior art systems is that at certain transmitting frequencies, in particular in the high-frequency spectrum ranging from approximately 3 to 30 megacycles, atmospheric conditions and variations in the ionosphere often produce a plurality of electrical signals at the receiver for each signal transmitted. These signals are produced by what is conventionally termed multipath phenomena, and often result in erroneous translation of the received signal. In order to overcome this limitation, the prior art systems utilize a slower speed of transmission in order to permit a time interval, between successive intelligence signals, which is greater than the signal delay period produced by multipath phenomena.

In order to obviate these and other limitations in the prior art systems, it has been proposed to represent the binary digits of the binary code to be transmitted as electrical signals of different frequencies. For example, the first place binary digit of a code may be represented by an electrical signal of either of two frequencies, $f_1$ and $f_2$, corresponding to the binary values zero and one, respectively, whereas the second place binary digit may be represented by an electrical signal of either of two frequencies $f_3$ and $f_4$, corresponding to the binary values of zero and one, respectively. Similarly, the other place binary digits of the binary code may each be represented by two different frequencies corresponding to the binary values of zero and one, respectively. In this manner, all of the binary digits of the code may be transmitted simultaneously or in a continuous sequence. Moreover, the frequencies of the electrical signals representing the binary digits may be selected so as to permit direct transmission of a plurality of signals of different frequencies, or on the other hand, may be suitable for modulating a high frequency carrier signal.

It has been found that conventional electronic oscillator techniques are of limited use in producing an electrical output signal of either of two frequencies, since it is difficult to obtain good frequency stability at either of two frequencies and, at the same time, rapid switching from one frequency to another.

The present invention, on the other hand, provides bi-frequency electronic oscillator networks which exhibit both excellent frequency stability at each of two operating frequencies and rapid reliable switching from one frequency to the other. In addition, the bi-frequency oscillator networks of this invention are relatively insensitive to variations in vacuum tube characteristics and associated circuit components. In general, the bi-frequency oscillator networks of the present invention include two electrically gated conventional electronic oscillators and a coupling network connected therebetween for providing bistable frequency operation, that is, for gating "off" the output signal of one oscillator while the other oscillator is generating an output signal. The coupling network also includes means for receiving an applied electrical input signal for switching the output signal from one oscillator to the other. The outputs of the oscillators may be taken as two complementary signals having different frequencies of oscillation, or may be combined in a combining network to produce a single electrical output signal having a frequency which switches almost instantaneously from one predetermined frequency value to a second predetermined frequency value.

More particularly, the bi-frequency oscillator networks of this invention include two gated electronic oscillators which may be conventional electron-coupled oscillators including an electron tube having an additional grid for gating the output signal from the oscillator, or may be other conventional oscillator circuits, such as Hartley or Colpitts, which are operated in conjunction with conventional gating or damping circuitry.

The coupling control networks herein disclosed for intercontrolling the gated electronic oscillators may be utilized to suppress the oscillations of one oscillator when the other is generating an output signal, or may be utilized to cut off one oscillator completely when the other is operating. In other words, the term "suppression," as herein utilized, means that an oscillator may continue to oscillate at its predetermined frequency although gated so as to produce no effective output signal, whereas the term "cut off" means that an oscillator ceases oscillations altogether. The use of suppressed oscillators is of particular utility when it is desired to switch frequencies rapidly and when it is preferable to have an output signal immediately available in response to the switching action, rather than to permit the oscillator which has been "cut off" to build up oscillations after having been switched "on."

According to one embodiment of the present invention, two gated electronic oscillators are utilized for alternately generating electrical signals of two different frequencies in response to applied electrical input signals corresponding to binary intelligence states. The coupling control network includes an impedance matrix which is utilized for intercoupling an output terminal of each gated oscillator to a control or gating circuitry of the other gated oscillator, thereby providing means for gating the output signal from either oscillator circuit while the other oscillator circuit is generating an output signal.

Still another embodiment of the present invention discloses a modified control network for intercoupling two crystal-controlled electron coupled oscillators in order to alternately generate two complementary electrical signals corresponding to binary coded intelligence states.

It is, therefore, an object of this invention to provide bi-frequency electronic oscillator networks for selectively generating output signals at either of two predetermined values of frequency.

Another object of this invention is to provide bistable bi-frequency electronic oscillator networks for selectively producing an output signal at either of two values of frequency.

It is also an object of this invention to provide a bi-frequency electronic oscillator network which is responsive to an applied electrical signal for switching from a first frequency of oscillation to a second frequency of oscillation.

A further object of this invention is to provide a bi-frequency electronic oscillator network which produces an electrical output signal of either of two operating frequencies and which may be rapidly switched from one frequency of operation to the other frequency of operation.

An additional object of this invention is to provide bi-frequency electronic oscillator networks for representing binary coded information as electrical signals of either of two predetermined frequencies corresponding to the binary values of zero and one.

Still another object of the present invention is to provide coupling and control networks for intercoupling two gated electronic oscillators to gate "off" the electrical output of either oscillator when the other oscillator is generating an electrical output signal.

It is still further an object of this invention to provide bi-frequency electronic oscillators which comprise two gated electronic oscillators operable under the control of a coupling network for generating an output signal having a frequency of either of two predetermined values and for switching from one frequency to the other frequency upon the application of an electrical switching signal to said coupling network.

It is also an object of this invention to provide the novel features which are believed to be characteristic of the invention as set forth particularly in the appended claims. The invention itself, however, both as to its organization and method of operation, together with further objects and advantages thereof, may be best understood by reference to the following description taken in connection with the accompanying drawings in which several embodiments of the invention are illustrated by way of examples. It is to be expressly understood, however, that the drawings are for the purpose of illustration and description only, and are not intended as a definition of the limits of the invention.

Figure 1:
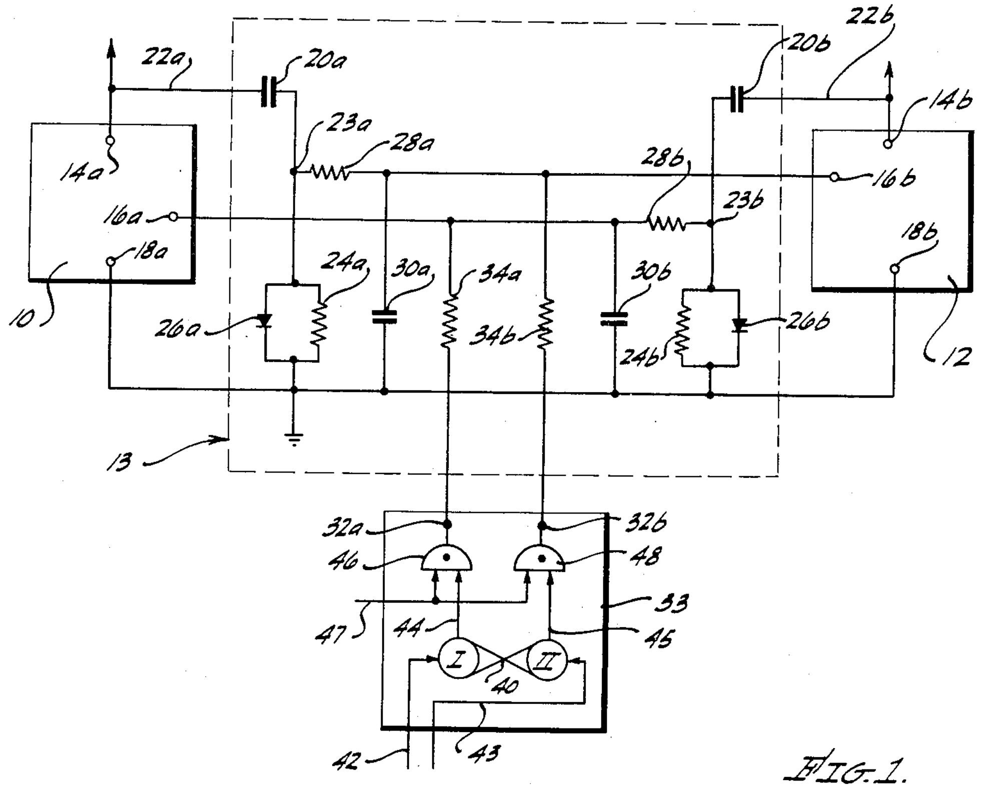
Fig. 1 is a block diagram of a bi-frequency oscillator network, according to this invention, including a schematic diagram of one form of coupling control network.
Figure 3:
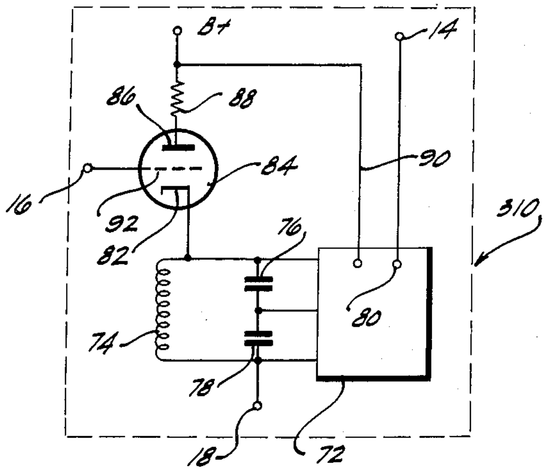
Figure 4:
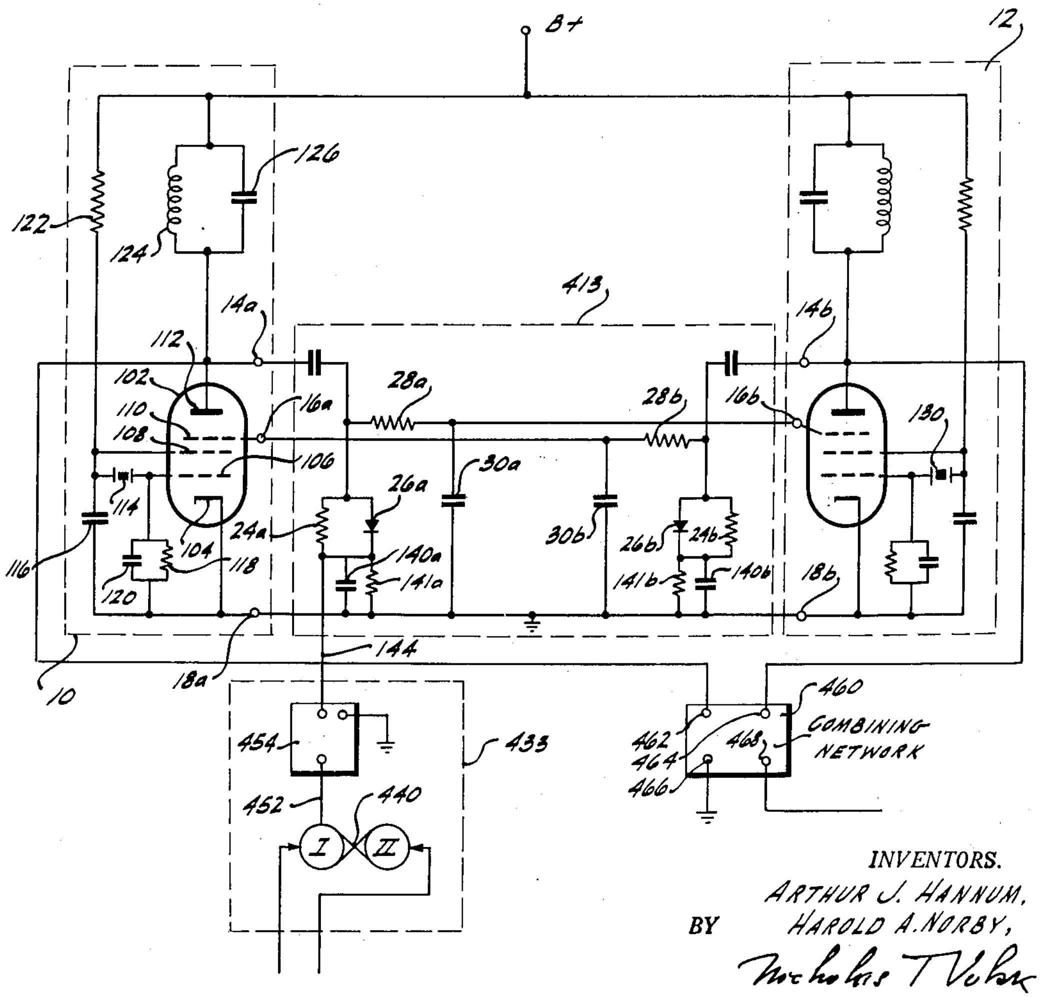

Fig. 3 is a schematic diagram of another form of gated electronic oscillator which may be utilized in the bi-frequency oscillator network of Fig. 1 by reversing the diodes in the coupling control network; and Fig. 4 is a schematic diagram of a bi-frequency oscillator, according to this invention, which includes two gated electron-coupled oscillators and a modified coupling control network connected therebetween.

Referring now to the drawings, there is shown in Fig. 1 a bi-frequency oscillator network, according to the present invention, which includes two gated electronic oscillators 10 and 12 tuned to two predetermined frequencies $f_1$ and $f_2$, respectively, and a coupling control network, generally designated 13, connected therebetween. Gated oscillators 10 and 12 and the portions of control network 13 associated with each oscillator contain corresponding components and terminals. Accordingly, corresponding elements of the gated oscillators and associated circuitry will be designated by like reference numbers, the elements associated with gated oscillators 10 and 12 being denoted by the suffix letters *a* and *b*, respectively.

Gated oscillators 10 and 12 are connected to a suitable source of anode potential, not shown, and include output terminals 14*a* and 14*b*, control terminals 16*a* and 16*b*, and grounding terminals 18*a* and 18*b*, respectively. Grounding terminals 18*a* and 18*b* are connected directly to ground in order to provide a ground return for gating oscillators 10 and 12.

In operation, each of gated oscillators 10 and 12 responds to an electrical gating signal applied at the associated control terminal of the oscillator for selectively producing an output signal at the associated output terminal. In other words, gated oscillators 10 and 12 are gated "on" or gated "off" under the control of the potential applied at the respective control terminals of the oscillators. Accordingly, as hereinafter used in this specification, the term "gated off" denotes that a gating signal has been applied to an oscillator and that the oscillator is producing no output signal at its associated output terminal, while the term "gated on" denotes that no gating signal has been applied to the oscillator and that the gated oscillator is producing an output signal at its associated output terminal.

Coupling control network 13 includes two coupling capacitors 20*a* and 20*b* having first terminals connected by associated conductors 22*a* and 22*b* to output terminals 14*a* and 14*b*, respectively. A second terminal of capacitor 20*a* is connected to one terminal 23*a* of a first rectifying circuit including a parallel combination of a resistor 24*a* and a diode 26*a*, the other terminal of the rectifying circuit being grounded. Similarly, terminal 23*b* of a second rectifying circuit, including a parallel combination of a resistor 24*b* and a diode 26*b*, is connected to a second terminal of capacitor 20*b*, the other terminal of the second rectifying circuit being connected to ground. Diodes 26*a* and 26*b* may be either vacuum tubes or semiconductor devices and have their cathodes connected to ground.

Circuit terminal 23*a* is coupled to control terminal 16*b* of gated oscillator 12 through a filter circuit including a resistor 28*a* and a capacitor 30*a*, while circuit terminal 23*b* is similarly coupled to control terminal 16*a* of gated oscillator 10 through a filter circuit including a resistor 28*b* and a capacitor 30*b*. Control terminals 16*a* and 16*b* are further coupled to two associated output terminals 32*a* and 32*b* of a pulse signal source 33 through two resistors 34*a* and 34*b*, respectively.

As previously set forth, each of gated oscillators 10 and 12 is gated "off" when a gating signal or gating potential is applied to the associated control terminal of the oscillator. Accordingly, in order to provide bistable operation of gated oscillators 10 and 12, it is the function of coupling control network 13 to provide the gating signal to either of gated oscillators 10 and 12 when the other gated oscillator is producing an electrical output signal at its associated output terminal. It is the additional function of control network 13 to provide switching means, responsive to electrical switching pulses received from pulse source 33, for alternately gating "on" or gating "off" gated oscillators 10 and 12 to alternately produce an output signal at output terminals 14*a* and 14*b*, respectively.

In order to more fully describe the operation of the bi-frequency oscillator network it will be assumed that gated oscillator 10 is gated "on" and is producing an electrical output signal having a predetermined frequency $f_1$ at output terminal 14*a*. The alternating-current component of this output signal is applied through capacitor 20*a* to the first rectifying circuit, resistor 24*a* and diode 26*a*, which rectifies the negative peaks thereof. The rectified signal is then filtered by resistor 28*a* and capacitor 30*a* and is applied as a negative direct-current potential to control terminal 16*b* of gated oscillator 12, thereby gating "off" gated oscillator 12. Since gated oscillator 12 is gated "off," and is, therefore, producing no output signal at terminal 14*b*, terminal 23*b* of network 13 is held substantially at ground potential by the low forward resistance of diode 26*b*, and no gating potential is applied to gated oscillator 10. Gated oscillator 10, therefore, will continue to produce an electrical output signal at terminal 14*a* and gated oscillator 12 will remain gated "off." The network will remain in this stable condition until an electrical switching signal is applied to coupling control network 13 from pulse source 33 for interchanging the gated "on" and gated "off" states of gated oscillators 10 and 12, respectively.

The switching action between gated oscillators 10 and 12 may be accomplished in any one of several manners. For example, a negative electrical pulse may be applied to coupling control network 13 from terminal 32*a* of pulse source 33, or a positive electrical pulse may be applied to network 13 from terminal 32*b* of pulse source 33. As will become more apparent when the switching action of the bi-frequency oscillator network is described, the combination of a negative electrical pulse from terminal 32*a* and a positive electrical pulse from terminal 32*b* will also function to switch the operation of gated oscillators 10 and 12.

When a negative electrical pulse is applied to network 13 from terminal 32*a* of pulse source 33, the potential at control terminal 16*a* is driven sufficiently negative to gate "off" gated oscillator 10, thereby suppressing or cutting off the electrical output signal appearing at output terminal 14*a*. This, in turn, allows terminal 23*a* to return to substantially ground potential, thereby removing or cancelling the gating potential applied at control terminal 16*b* of gated oscillator 12 and permitting oscillator 12 to be gated "on." Accordingly, an electrical output signal having a predetermined frequency $f_2$ will appear at output terminal 14*b*. The rectifying and filtering circuitry of coupling control network 13 which is associated with gated oscillator 12 then functions in the manner previously described to convert a portion of the electrical output signal at terminal 14*b* to a negative gating potential. This gating potential is applied at control terminal 16*a* to maintain gated oscillator 10 gated "off" after the negative switching pulse is removed from control terminal 32*a*.

On the other hand, as stated above, the switching operation may be performed by applying a positive electrical pulse from terminal 32*b* of pulse source 33 through resistor 34*b* of network 13 to terminal 16*b* of oscillator 12. The positive pulse is of sufficient amplitude to overcome or cancel the negative gating potential supplied from terminal 14*a* and will gate "on" gated oscillator 12 and produce an electrical output signal at the predetermined frequency $f_2$ at terminal 14*b*. A portion of the output signal at terminal 14*b* will be converted to a negative gating potential by control network 13, and will be applied at control terminal 16*a* to gate "off" gated oscillator 10.

After the switching operation has taken place, gated oscillator 12 will continue to produce an electrical output signal at frequency $f_2$ at terminal 14*b* and, in conjunction with control network 13, will gate "off" gated oscillator 10. It is apparent, therefore, that in order to again switch the bifrequency oscillator network and thereby gate "on" gated oscillator 10, either a negative electrical pulse must be applied from terminal 32*b* to network 13, or a positive electrical pulse must be applied from terminal 32*a*.

Operating frequencies $f_1$ and $f_2$ may be selected in either the audio or radio frequency spectrum, depending, of course, upon the particular electrical application in which the bi-frequency oscillator network is to be utilized. Moreover, the frequency difference between frequencies $f_1$ and $f_2$ may be selected arbitrarily within the limits of the electrical circuitry which is to be utilized for transmitting and detecting these frequencies.

It should be pointed out, however, that since capacitors 30*a* and 30*b* and resistors 28*a* and 28*b* are utilized for filtering rectified signals of frequencies $f_1$ and $f_2$ in order to produce negative gating potentials, the selection of values for these resistors and capacitors is governed, to a large extent, by the frequency values selected for $f_1$ and $f_2$. For example, when frequencies $f_1$ and $f_2$ are between 5 and 10 megacycles, typical values which have been found suitable for resistors 28*a* and 28*b* and capacitors 30*a* and 30*b* are 100 kilohms and 100 micro-microfarads, respectively.

Although gated oscillators 10 and 12 generate two separate electrical output signals at output terminals 14*a* and 14*b*, respectively, it is to be understood that the output signals may be combined in any suitable combining network known to the art in order to produce a single electrical output signal. In this manner, the output signal from the combining network may have a frequency $f_1$ or a frequency $f_2$, depending, of course, upon whether gated oscillator 10 or gated oscillator 12 is generating an electrical output signal.

The electrical switching pulses applied to network 13 from terminals 32*a* and 32*b* of pulse source 33 may be generated in response to an intelligence signal in any of several conventional manners known to the art. For purposes of illustration, it will be assumed that the output signals from the bi-frequency oscillator network are to correspond to the binary values of zero and one, and are to be switched in such a manner as to represent the binary place digits of binary coded intelligence.

Referring again to Fig. 1, there is shown one embodiment of pulse source 33 which may be utilized for generating electrical switching pulses corresponding to binary coded intelligence. In Fig. 1, pulse source 33 includes a conventional flip-flop or bistable multivibrator 40 having two conduction sections which are designated by the Roman numerals I and II, respectively. Associated with sections I and II of flip-flop 40 are two input conductors 42 and 43, and two output conductors 44 and 45, respectively.

Output conductor 44 is connected to one input terminal of a conventional two-input-terminal "and" gate 46, the other input terminal of gate 46 being connected to a clock pulse bus 47. Similarly, output conductor 45 is connected to a first input terminal of an "and" gate 48, a second input terminal of gate 48 being connected to clock pulse bus 74. Each of gates 46 and 48 also includes an output conductor connected to terminals 32*a* and 32*b*, respectively.

In operation, two complementary electrical signals corresponding to a binary place digit of a binary coded word or intelligence signal are shifted into flip-flop 40 over input conductors 42 and 43, the shifting circuitry being omitted for reasons of clarity. The electrical signals appearing on output conductors 44 and 45, therefore, will have complementary relatively high and low potential levels corresponding to the binary values zero and one. For purposes of illustration, it will be assumed that a high potential level on conductor 44 and a correspondingly low potential level on conductor 45 correspond to the binary value one, whereas a high potential level on conductor 45 and a correspondingly low potential level on conductor 44 correspond to the binary value zero.

The potentials on conductors 44 and 45 are applied to gates 46 and 48 for gating a negative clock pulse signal which is periodically applied to gates 46 and 48 over bus 47 from a clock pulse source, not shown. If it is further assumed that gates 46 and 48 will pass a clock pulse only when the potential level applied from flip-flop 40 is high, it is apparent that an electrical switching pulse will appear at output terminal 32*a* only if the signals corresponding to the binary value one are stored in flip-flop 40, while a switching pulse will appear at output terminal 32*b* only if the signals corresponding to binary value zero are stored in flip-flop 40.

In this manner, electrical switching signals may be generated for switching the output frequency of the bi-frequency oscillator network so that the output frequency corresponds to the binary values stored in flop-flop 40. In other words, if the binary place digit stored in flip-flop 40 has a value of one, a switching signal is applied to the bi-frequency oscillator network from output terminal 32*a* of pulse source 33 for gating "off" gated oscillator 10 and thereby gating "on" gated oscillator 12. On the other hand, if the binary place digit stored in flip-flop 40 has a value of zero, a switching signal is applied to the bi-frequency oscillator network from output terminal 32*b* of pulse source 33 for gating "off" gated oscillator 12, thereby gating "on" gated oscillator 10.

It is clear that if the succeeding binary place digit shifted into flip-flop 40 has the same binary value as the preceding binary place digit, the switching signal generated by pulse source 33 will have no effect on the output signal of the bi-frequency oscillator network. For example, if an output signal corresponding to the binary value one is being produced at output terminal 14*b*, and the succeeding binary place digit shifted into flip-flop 40 also has a binary value of one, the electrical switching signal applied to coupling control network 13 from terminal 32a of pulse source 33 will have no effect on the operation of the bi-frequency oscillator network, since gated oscillator 10 is already gated "off" and gated oscillator 12 is already gated "on."

It is to be expressly understood, of course, that other conventional pulse signal generators known to the art may be utilized for switching the bi-frequency oscillator network and that pulse source 33 is not intended as a limit to the invention.

Gated oscillators 10 and 12 may include any conventional electronic oscillator which may be gated electronically to selectively produce an output signal. For example, electron-coupled oscillators, including a vacuum tube having an additional grid responsive to applied gating signals, have been found suitable for application in the bi-frequency oscillator networks of this invention. On the other hand, other conventional oscillator circuits such as Colpitts, Hartley or tuned-plated, tuned-grid oscillators may be utilized in conjunction with conventional gating or damping circuitry for selectively producing an electronically gated output signal. Several specific embodiments of gated oscillators 10 and 12 will now be considered.

Figure 2:
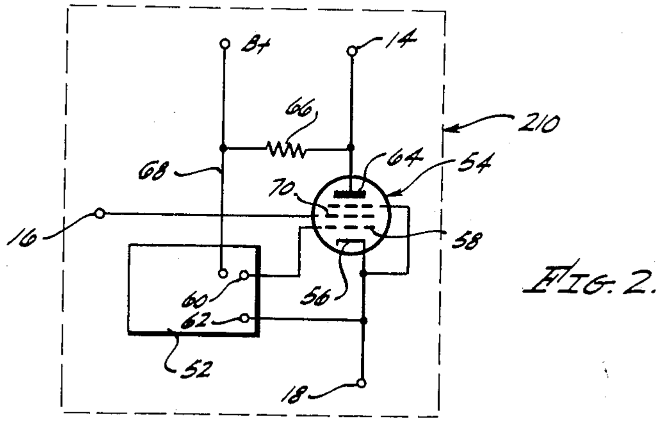
Fig. 2 is a schematic diagram of one form of gated electronic oscillator which may be utilized in the bi-frequency oscillator network of Fig. 1.

Referring now to Fig. 2, there is shown a gated electronic oscillator 210 including an electronic oscillator 52 which may be any conventional electronic oscillator known to the art, and an associated gating circuit including a pentode gating tube 54 having a cathode 56 and a control grid 58 connected to two output terminals 60 and 62, respectively, of oscillator 52. Pentode 54 has an anode 64 connected to the B+ terminal of a source of anode potential, not shown, through a resistor 66, and to an output terminal 14. The source of anode potential is also connected to oscillator 52 through a conductor 68. Gated oscillator 210 also includes a control terminal 16 which is connected to a screen grid 70 of tube 54, and a grounding terminal 18 which is connected to cathode 56 of tube 54 and output terminal 62 of oscillator 52.

When gated oscillator 210 is operated in the bi-frequency oscillator network of Fig. 1, oscillator 52 generates an output signal which is applied to control grid 58 of gating tube 54. Since terminal 18, as shown in Fig. 1, is grounded, an output signal having a frequency corresponding to the predetermined frequency of oscillator 52 will appear at output terminal 14 of gated oscillator 210 unless a negative gating potential sufficient to drive pentode 54 below cut-off is applied to screen grid 70 from control terminal 16. In this manner, the coupling control network of the bi-frequency oscillator network, electronically gates the output signal from gated electronic oscillator 210.

It is clear, of course, that other conventional electronic gating circuits, such as circuits including diode gates, may be utilized in conjunction with oscillator 52 in order to provide gated electronic oscillators suitable for use in the bi-frequency oscillator networks of this invention. In addition, electronic damping circuits may be utilized with conventional electronic oscillators for generating a gated electrical output signal.

Referring now to Fig. 3, there is shown a gated electronic oscillator 310 which includes a conventional electronic oscillator 72 having a tuned circuit comprising an inductor 74 and two bridged capacitors 76 and 78. An output terminal 80 of oscillator 72 is connected to an output terminal 14 of gated oscillator 310, while one end of inductor 74 is connected to a grounding terminal 18. Connected to the other end of inductor 74 is a cathode 82 of a triode damping tube 84 which has an anode 86 connected to the B+ terminal of a source of anode potential, not shown, through a resistor 88. The source of anode potential is also connected to oscillator 72 by a conductor 90. Triode 84 also includes a control grid 92 which is connected to a control terminal 16 of gated oscillator 310.

When operated in the bi-frequency oscillator networks of this invention, gated oscillator 310 will generate an output signal at output terminal 14 when damping tube 84 is non-conducting, or in other words, when the potential at control terminal 16 is below the cut-off potential of the damping tube. When the potential at control terminal 16 is raised above cut-off, triode 84 conducts an electron current which also flows through inductor 74, thereby lowering the Q of the tank circuit of oscillator 72 and gating the oscillator "off" by damping out oscillations. Thus, by merely applying a suitable gating potential to control terminal 16, the output signal appearing at output terminal 14 of gated oscillator 310 may be gated "on" and "off" in accordance with the gating signal.

It will be noted that the gated oscillator of Fig. 3 produces an output signal at output terminal 14 when the potential of the gating signal applied at terminal 16 is comparatively low, whereas the gated oscillator described in Fig. 2 produces an output signal at output terminal 14 when the potential of the control signal is comparatively high. Therefore, in order to utilize the gated oscillator shown in Fig. 3 in the bi-frequency oscillator network shown in Fig. 1, diodes 26*a* and 26*b* of Fig. 1 should be reversed so that their anodes are grounded, thereby furnishing half-wave rectification of the positive peaks of the alternating-current signals applied to terminals 23*a* and 23*b*, respectively, from output terminals 14*a* and 14*b*, respectively.

It is obvious, of course, that other conventional damping circuits known to the art may be utilized for gating gated oscillator 310 "on" and "off," and it is, therefore, to be understood that the structure shown in Fig. 3 is merely illustrative, and is not intended as a limit to the invention.

The description of the invention has thus far related to gated electronic oscillators including conventional electronic oscillators which are gated "on" and "off" by conventional gating and damping circuits. If desired, however, electronic gating of the output signals may be accomplished by utilizing gated oscillators including a modified electron-coupled oscillator.

Referring now to Fig. 4, there is shown a bi-frequency oscillator network, according to this invention, which includes two gated electronic oscillators 10 and 12, respectively, and a coupling control network 413 connected therebetween. Since gated oscillators 10 and 12 differ from each other only in pre-selected frequencies of operation, only gated oscillator 10 will be described in detail, it being understood that gated oscillator 12 includes similar structure and components.

Gated oscillator 10 comprises an electron-coupled oscillator which includes a multi-grid electron discharge device, such as a pentode tube 102 having a cathode 104, a control grid 106, a screen grid 108, a suppressor grid 110, and an anode 112. Control grid 106 and screen grid 108 are interconnected by a piezoelectric crystal 114. Cathode 104 is coupled to screen grid 108 through a capacitor 116, and to control grid 106 through a parallel circuit of a resistor 118 and a capacitor 120. It can be seen that the above connections of tube 102 form a conventional Pierce-type crystal oscillator operable at the predetermined tuned frequency $f_1$ of crystal 114. Screen grid 108 is also connected to the B+ terminal of a source of anode potential, not shown, through a resistor 122, and cathode 104 is connected to a grounding terminal **18*a***.

Anode 112 of tube 102 is connected to an otuput terminal **14*a* and to the source of anode potential through a tuned tank circuit including an inductor 124 and a capacitor 126, the tuned frequency of the tank circuit being equal to the predetermined tuned frequency $f_1$ of crystal 114. Suppressor grid 110 of tube 102 is connected to a control terminal 16*a* of gated oscillator 10 for gating "off" the electron-current which normally flows between screen grid 108 and anode 112**.

Tube 102 may be any commercially available vacuum tube which exhibits good suppressor grid control characteristics. For example, 6AS7 miniature tubes and 5636 sub-miniature tubes have been found suitable for use in the bi-frequency oscillator networks of this invention. It is obvious, of course, that other conventional multigrid tubes such as pentagrid mixing tubes may be utilized in place of pentode 102 in the gated electronic oscillators.

Gated oscillator 12, as previously set forth, is similar to gated oscillator 10 with the exception that a piezoelectric crystal 130 is utilized in the oscillator for generating electrical signals at a predetermined frequency $f_2$, and the tuned tank anode circuit is tuned to frequency $f_2$. Thus, by providing bistable operation of gated oscillators 10 and 12 through coupling control network 413, an output signal from the bi-frequency oscillator network may be selectively produced at either frequency $f_1$ or frequency $f_2$.

Coupling control network 413 corresponds to control network 13 of Fig. 1 in that it includes similar rectifying and filter circuits associated with gated oscillators 10 and 12. The components of these circuits are, therefore, designated by the same reference numerals utilized in Fig. 1, and it is considered that further description of this portion of control network 413 is unnecessary.

Coupling control network 413 differs from network 13 of Fig. 1 only in the point and method of application of electrical switching pulses for switching the output frequency of the bi-frequency oscillator network. Thus, as shown in Fig. 4, the rectifying network including resistor **24*a* and diode 26*a* is coupled to ground through a bypass capacitor 140*a* and a resistor 141*a*, and to a source 433 of electrical switching pulses by a conductor 144. Similarly, the rectifying network including resistor 24*b* and capacitor 26*b* is coupled to ground through a bypass capacitor 140*b* and a resistor 141*b*. It should be pointed out that resistors 141*a* and 141*b*** have relatively high values of the order of one half megohm for providing a direct-current return to ground potential from the associated rectifying networks, and may be eliminated if the output circuit of the switching source provided for switching the bi-frequency oscillator includes a direct-current return to ground potential.

In order to fully describe the operation of the bi-frequency oscillator network of Fig. 4, it will be assumed that gated oscillator 10 is functioning as a conventional electron-coupled oscillator and is producing an output signal having a frequency $f_1$ at output terminal **14*a*. The rectifying and filtering circuits of coupling control network 413 which are associated with gated oscillator 10 convert a portion of this signal to a negative gating potential by rectification and filtering of the negative peaks of the output signal in the manner previously described in Fig. 1, and apply the negative gating potential to terminal 14*b* of gated oscillator 12, thereby maintaining the suppressor grid of the oscillator tube sufficiently negative to gate "off" gated oscillator 12 and prevent an output signal from appearing at output terminal 14*b***.

Since gated oscillator 12 is gated "off," the potential of suppressor grid 110 of pentode 102 remains above tube cut-off and thereby permits gated oscillator 10 to continue to produce an output signal. In order to switch the operation of the bi-frequency oscillator network from gated oscillator 10 to gated oscillator 12 and thereby generate an output signal having a frequency $f_2$, a switching signal is applied to coupling control network 413 from pulse source 433.

Although switching of the bi-frequency oscillator network may be accomplished in the manner previously set forth in the description of Fig. 1, switching may also be accomplished by applying electrical pulses at only one point in coupling control network 413. Assume that gated oscillator 10 is gated "on" and is producing an output signal, and that gated oscillator 12 is gated "off." Under these conditions, a negative electrical pulse applied from pulse source 433 will have no effect on the operation of the bi-frequency oscillator network, since terminal **16*b* of gated oscillator 12 is already biased negatively by gating potential from coupling control network 413. If, however, a positive electrical pulse is applied to coupling control network 413 from pulse source 433, the gating potential is overcome and oscillator 12 is gated "on" thereby producing an output signal at output terminal 14*b*. This, in turn, results in a negative gating potential being generated by coupling control network 413 for gating "off" gated oscillator 10**.

In order to again switch the operation of the bi-frequency oscillator from gated oscillator 12 to gated oscillator 10, a negative pulse must be applied from pulse source 433, since a positive electrical pulse will effectively only drive control terminal **16*b* of gated oscillator 12, which is already gated "on," to a higher potential. When a negative electrical switching pulse is applied to network 413, the potential at control terminal 16*b* is lowered in accordance with the amplitude of the switching pulse, thereby gating "off" gated oscillator 12 and suppressing the output signal at output terminal 14*b*, which, in turn, allows the potential at control terminal 16*a* to rise and thereby gate "on" gated oscillator 10. It is clear, of course, that once gated oscillator 10 produces an output signal, a negative bias is developed by control network 413 for continuing to gate "off" gated oscillator 12**.

One advantage which is gained by applying the electrical switching signals to the rectification circuit including diode **26*a* and resistor 24*a*, as opposed to the method shown in Fig. 1, is that the switching signal and rectified signal are additively combined in series without any appreciable attenuation, and the potential at control terminal 16*b* of gated oscillator 12 is changed in accordance with substantially the peak potential of the switching signal. In network 13 of Fig. 1, on the other hand, the switching signal is applied through resistors 34*a* and 34*b* which effectively are bridged to ground potential by resistors 28*a* and 28*b*, and resistors 24*a* and 24*b*, respectively, thereby attenuating the switching signal so that the full potential of the switching signal does not appear at control terminals 16*a* and 16*b*. It should be pointed out that resistors 141*a* and 141*b* in control network 413** are the order of one half megohm for providing a direct-current return to ground from the associated rectifying network, and may be eliminated if the output impedance of the switching source provided for switching the bi-frequency oscillator network has a direct-current.

The switching signals applied to coupling control network 413 may be generated in any of several conventional manners known to the art. For example, if the output signals from the bi-frequency oscillator network are to correspond to the binary place digits of a binary coded intelligence signal, electrical switching pulses may be generated which correspond to the sequential binary values of the binary digits which are to be thus represented.

Referring again to Fig. 4, there is shown one embodiment of pulse source 433 which may be utilized with the bi-frequency oscillator networks of the present invention. Pulse source 433 includes a conventional flip-flop 440, similar to flip-flop 40 of Fig. 1, which includes two conduction sections designated by Roman numerals I and II, respectively, each conduction section having an associated input conductor. Conduction section I also includes an output conductor 452 which is connected to an input terminal of a differentiating circuit 454, which in turn has two output terminals connected to ground and conductor 144, respectively.

In operation, electrical signals corresponding to the binary place digits of a binary coded intelligence signal are sequentially shifted into flip-flop 440 by a shifting circuit, not shown. The potential level on output conductor 452 will, therefore, be either relatively high or relatively low, depending on whether the binary place digit stored in the flip-flop has a value of zero or one. Therefore, each time the binary value stored in flip-flop 440 is changed, differentiating circuit 154 will produce an electrical output pulse corresponding to the change in the conduction sections of flip-flop 440. For example, if it is assumed that a high potential level corresponding to the binary value one is present on output conductor 452 of flip-flop 440, and if it is further assumed that gated oscillator 12 is generating an output signal corresponding to the binary value one, a conversion to the binary value zero in flip-flop 440 will produce a concomitant low potential level on conductor 452. The signal thus applied to conductor 452 from flip-flop 440 is, in turn, differentiated by differentiating circuit 454 which produces a negative electrical pulse on conductor 144 for switching the operation of the bi-frequency oscillator network to generate an output signal at output terminal 14*a* of gated oscillator 10. When the binary value stored in flip-flop 440 is again changed to one, differentiating circuit 454 produces a positive electrical pulse for again switching the bi-frequency oscillator network to generate an output signal from gated oscillator 12. It is to be understood, of course, that the structure of pulse source 433 is merely illustrative and is not intended as a limit to the invention.

As previously set forth, the output signals from gated oscillators 10 and 12 may be combined in any suitable combining network known to the art in order to produce a single output signal having a frequency corresponding to that of the output signal from the gated oscillator which is gated "on."

Referring again to Fig. 4, there is shown a combining network 460 which includes two input terminals 462 and 464 connected to output terminals 14*a* and 14*b* of gated oscillators 10 and 12, respectively. Network 460 also includes an output terminal 466 connected to ground and an output terminal 468. Combining network 460 may be a conventional passive element addition network or may include a conventional vacuum tube mixing circuit. Since the structure of combining network 460 is not considered part of this invention, no specific circuitry has been shown.

In operation, a composite electrical output signal will appear across output terminals 466 and 468, the frequency of the composite output signal corresponding to the output signal frequency of the gated oscillator which is gated "on."

Thus, the bi-frequency oscillator networks of this invention may be utilized for generating output signals at either of two predetermined frequencies in accordance with switching signals applied to the control networks. In addition the output signals may be combined in order to produce a composite bi-frequency electrical output signal. It is clear that variations in the bi-frequency oscillator networks herein disclosed may occur to those skilled in the art. For example, the rectifying and filtering circuits of the coupling control networks herein described may be readily altered within the skill of the art by merely substituting equivalent circuits.

It should be understood, therefore, that the foregoing disclosure relates to only preferred embodiments of the invention and that numerous modifications or alterations may be made therein without departing from the spirit and the scope of the invention as set forth in the appended claims.

What is claimed as new is:

1. A bistable bi-frequency oscillator network for selectively generating electrical signals having first and second predetermined frequencies, respectively, said oscillator network comprising: first and second gated oscillators normally operable for respectively producing a first electrical output signal having said first predetermined frequency and a second electrical output signal having said second predetermined frequency, each of said oscillators including a control terminal, an output terminal, and being operable in response to an electrical gating signal at the control terminal for preventing the electrical output signal from appearing at the output terminal; and a control network responsive to an output signal at the output terminal of either one of said gated oscillators for producing an electrical gating signal at the control terminal of the other of said gated oscillators for gating "off" said other gated oscillator, said control network including first and second rectifying circuits electrically coupled to the output terminals of said first and second gated oscillators, respectively, and first and second filter circuits electrically coupled between said first and second rectifying circuits and the control terminals of said second and first gated oscillators, respectively.

2. The bi-frequency oscillator network defined in claim 1 wherein each of said first and second gated oscillators includes: an electronic oscillator having an output circuit; and an electronic gating circuit for gatably intercoupling said output circuit with the associated output terminal, said gating circuit including means connected to the associated control terminal for gating "off" the gated oscillator in response to said gating signal to suppress the output signal at said associated output terminal.

3. The bi-frequency oscillator network defined in claim 1 wherein each of said first and second gated oscillators includes: an electronic oscillator having a tuned tank circuit, and an output circuit connected to the associated output terminal; and a damping circuit connected to said tank circuit and responsive to said gating signal for damping out oscillations in said tank circuit, thereby gating "off" the gated oscillator.

4. The bi-frequency oscillator network defined in claim 1 wherein each of said first and second gated oscillators comprises an electron-coupled oscillator including an electron discharge device having at least an anode, a suppressor grid, a control grid and a cathode, said anode and suppressor grid being connected to the associated output and control terminals, respectively, said anode, screen grid, control grid and cathode of said electron discharge device being electrically intercoupled to form an electron-coupled oscillator, said suppressor grid being responsive to said gating signal to gate "off" the electron flow between said screen grid and said anode, thereby gating "off" the gated oscillator.

5. A bistable bi-frequency oscillator network for selectively generating electrical signals having first and second predetermined frequencies, respectively, in response to an applied electrical switching signal, said oscillator network comprising: first and second gated oscillators for respectively producing a first electrical output signal having said first predetermined frequency and a second electrical output signal having said second predetermined frequency, each of said oscillators including a control terminal, an output terminal, and means responsive to an electrical gating signal at the control terminal for producing the respective output signal at the output terminal; and a control network responsive to the output signal at the output terminal of each one of said gated oscillators for producing an electrical gating signal at the control terminal of the other of said gated oscillators for gating "off" said other gated oscillator, said control network including a rectifying circuit electrically coupled to the output terminal of each one of said gated oscillators and a filter circuit electrically coupled between said rectifier circuit and the control terminal of the other of said gated oscillators, said control network also including means responsive to the switching signal for cancelling said electrical gating signal to gate "on" said other gated oscillator, thereby switching the operation of the bi-frequency oscillator network.

6. A bistable bi-frequency oscillator network for selectively generating electrical signals at first and second predetermined frequencies, respectively, said oscillator network comprising: first and second gated electronic oscillators each having a control terminal and an output terminal, said first and second gated oscillators being normally gated "on" for producing at said output terminals electrical output signals having said first and second predetermined frequencies, each of said gated oscillators being gated "off" in response to an electrical gating signal at the associated control terminal for preventing the output signal from appearing at the associated output terminal; and a control network responsive to the output signal at the output terminal of each one of said gated oscillators for producing an electrical gating signal at the control terminal of the other of said gated oscillators for gating "off" said other gated oscillator, said control network including a rectifying circuit electrically coupled to the output terminal of each one of said gated oscillators and a filter circuit electrically coupled between said rectifier circuit and the control terminal of the other of said oscillators, said control network also including means responsive to the switching signal for overcoming said electrical gating signal to gate "on" said other gated oscillator, thereby switching the operation of the bi-frequency oscillator network.

7. A bistable bi-frequency oscillator network selectively responsive to first and second electrical switching signals representing the binary values of zero and one, respectively, for operating in first and second complementary stable states, respectively, said oscillator network generating a first electrical output signal having a first predetermined frequency and a second electrical output signal having a second predetermined frequency in said first and second stable states, respectively, said network comprising: first and second gated oscillators for generating said first and second output signals, respectively, each of said gated oscillators including an output terminal at which appears the respective output signal, a control terminal, and means responsive to an electrical gating signal at the control terminal for gating "off" the output signal from the output terminal; and a control network electrically connected between said first and second gated oscillators and selectively responsive to said first and second electrical switching signals for operating said oscillators in the stable state corresponding to the switching signal, said network including first means responsive to the output signal at the output terminal of each one of said gated oscillators for producing the electrical gating signal at the control terminal at the other of said gated oscillators, and second means responsive to said first and second electrical switching signals for cancelling the electrical gating signal at the control terminal of said first and second gated oscillators, respectively.

References Cited in the file of this patent

UNITED STATES PATENTS

| | | |
|---|---|---|
| 2,448,336 | Weiner | Aug. 31, 1948 |
| 2,457,790 | Wild | Dec. 28, 1948 |
| 2,491,387 | Miller | Dec. 13, 1949 |
| 2,647,172 | Jeanlin | July 28, 1953 |